United States Patent [19]

Ivey

[11] Patent Number: 4,986,687

[45] Date of Patent: Jan. 22, 1991

[54] AD-IV BREAKAWAY SYSTEM FOR TIMBER UTILITY POLES

[76] Inventor: Don L. Ivey, 4103 Carter Creek Pkwy., Bryan, Tex. 77802

[21] Appl. No.: 353,868

[22] Filed: May 18, 1989

[51] Int. Cl.$^5$ .............................................. F16B 7/00
[52] U.S. Cl. ........................................ 403/2; 403/24; 403/286; 403/293; 256/13.1
[58] Field of Search ...................... 403/2, 11, 24, 286, 403/292, 293, 312; 256/13.1, 19; 52/98–100; 248/160; 285/2–4

[56] References Cited

U.S. PATENT DOCUMENTS

| | | | |
|---|---|---|---|
| 3,912,405 | 10/1975 | Katt | 403/2 |
| 4,052,826 | 10/1977 | Chisholm | 403/2 X |
| 4,071,970 | 2/1978 | Strizki | 403/2 X |
| 4,126,403 | 11/1978 | Sweeney et al. | 403/2 |
| 4,424,988 | 1/1984 | Cowx | 285/2 |
| 4,607,824 | 8/1986 | Krage et al. | 256/13.1 X |
| 4,720,204 | 1/1988 | Johnson | 403/2 X |

FOREIGN PATENT DOCUMENTS 814290  6/1969  United Kingdom ................ 285/2

OTHER PUBLICATIONS

J. Labra, C. Kimball, Jr., Development of Safer Utility Poles, Jan. 1983, Southwest Research Institute, Houston, Texas, pp. 1–25.

H. J. Hignett, High Speed Impact Test on a 40 ft Lighting Column Fitted with a Break-away Joint, Crawthorne Roadside Research Laboratory, Ministry of Transport, RRL Report LR 67, 1967.

T. C. Edwards, J. E. Martinez, W. F. McFarland, H. E. Ross, Jr., Development of Design Criteria for Safer Luminaire Supports, National Cooperative Highway Research Program Report 77, Highway Research Board, 1969.

R. M. Olson, N. J. Rowan, T. C. Edwards, Break-Away Components Produce Safer Roadside Signs, published in Highway Research Record No. 174, 1967.

Don L. Ivey and James R. Morgan, Safer Timber Utility Poles, DTFH 61-83-0-00009, Sep. 1985.

Primary Examiner—Andrew V. Kundrat
Assistant Examiner—Franco S. DeLiguori
Attorney, Agent, or Firm—Arnold, White & Durkee

[57] ABSTRACT

A breakaway system is disclosed for timber utility poles. The breakaway system limits the amount of force and energy imparted to an impacting vehicle and its occupants by incorporating an arrangement of slip plates and bolts to form a shear plane on the utility pole at or near ground level, and by providing a hinge mechanism on an upper section of the utility pole below conducting lines and the like. The material and configuration of the lower shear plates are selected to permit activation for any direction of collision loading. The material and configuration of the upper connection or hinge are selected to allow for adequate resistance to environmental loads while at the same time allowing for precise determination of the magnitude of failure load. In addition, the combination of upper connectors prevents the lower portion of the utility pole from rotating upward into the conducting wires after a vehicle impact. In this manner, impact by a moving vehicle with a timber utility pole equipped with the breakaway device shears the lower connection causing a middle portion of the timber utility pole to rotate upward. The upper connection allows limited rotation sufficient to permit the impacting vehicle safely to travel completely beneath the middle section of the utility pole while at the same time preventing the middle section from impacting the conducting wires carried by the utility pole.

9 Claims, 3 Drawing Sheets

U.S. Patent    Jan. 22, 1991    Sheet 1 of 3    4,986,687
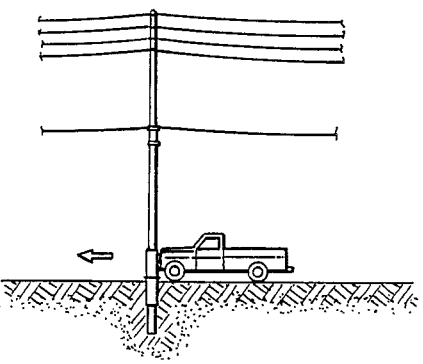
FIG.1a
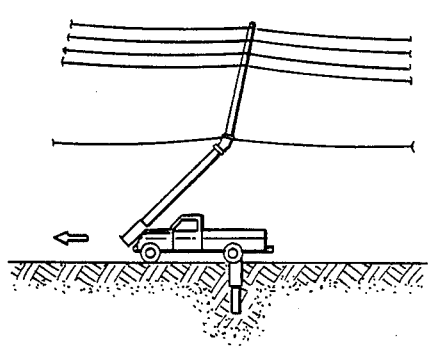
FIG.1b
FIG.1c
FIG.1d
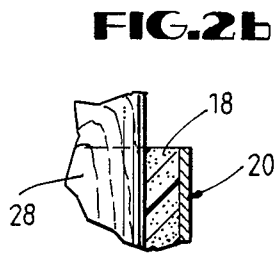
FIG.2b
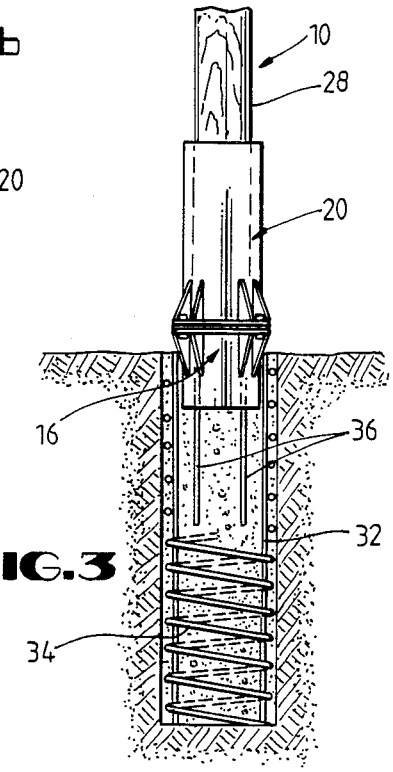
FIG.2a
FIG.3

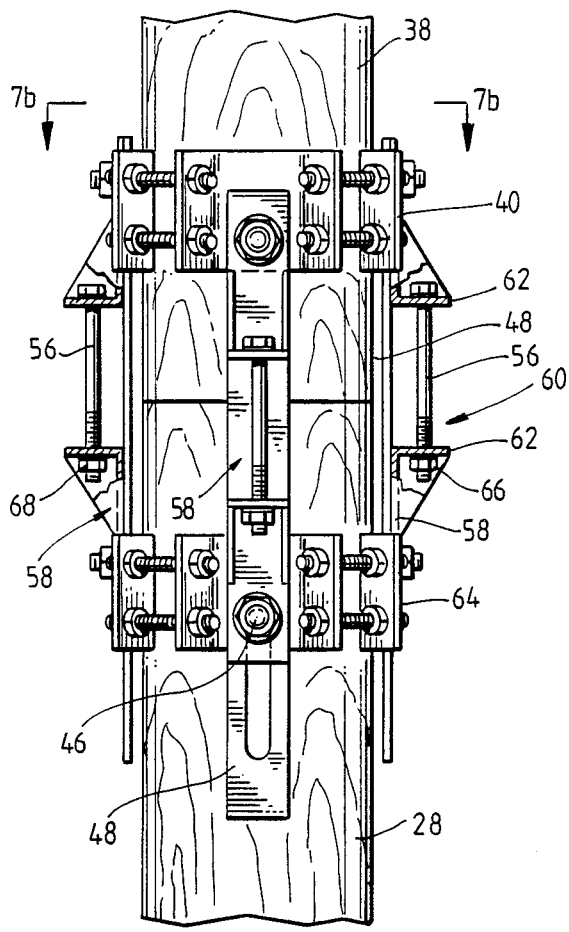
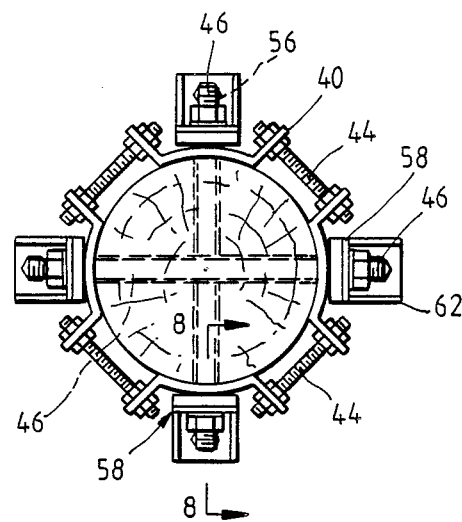
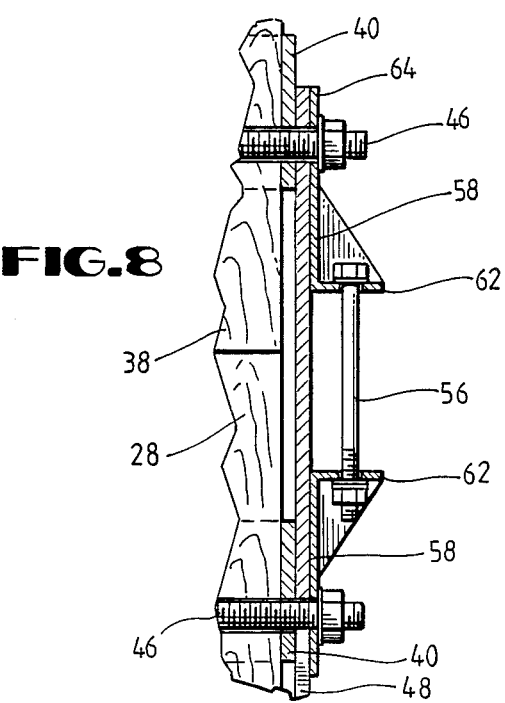

ately of two plates with cut slots. One plate is welded to the base of the luminaire pole and the other plate is welded to a luminaire mount which is embedded into the ground. Bolts are inserted into the slots to keep the two plates together. The bolts are tightened to a predetermined torque. Upon impact, the top plate, with the luminaire support attached, tends to slide in the direction of vehicle travel. Thus, the bolts are forced to slide out of the slots, freeing the luminaire support to move with the vehicle.

AD-IV BREAKAWAY SYSTEM FOR TIMBER UTILITY POLES

BACKGROUND OF THE INVENTION

The present invention relates generally to breakaway devices for rigid poles and posts implanted along roadways. The purpose of a breakaway device is to limit the amount of force and energy imparted to an impacting vehicle and its occupants by incorporating some form of failure mechanism into the pole base or into the pole itself.

With the ever increasing presence of the automobile on roadways and the corresponding increase in the number of utility poles, luminaires and road signs ground-mounted at the side of roadways, it became evident years ago that the risk of vehicles crashing into these ground-mounted structures would also become increasingly greater.

In a report entitled "Accident Analysis-Breakaway and Non-Breakaway Poles Including Sign and Light Standards Along Highways" Chapter 2, by King K. Mac and Robert L. Mason, DOT-HS-805-605, August, 1980, the authors reported that single-vehicle fixed object accidents account for only a small portion of all reported accidents. However, there is a disproportionate number of fatal accidents resulting from these relatively few accidents. Poles, such as utility poles, luminaires, sign or traffic signal supports are the most frequently struck objects in urban areas and among the more frequently struck objects in rural areas. The resultant injury severity of pole collisions, particularly those involving utility poles, is very high. Over half of these pole impacts are injury producing, and the injury frequency ranks right behind that corresponding to rollovers and impacts with bridge embankments.

In an effort to lessen the effects of these vehicular/pole collisions, D. L. Hawkins of the Texas Highway Department conceptualized the idea for slip base mounts for ground-mounted signs in the mid-1960's. The basic idea behind the slip base is to prevent a ground-mounted structure from rigidly resisting the impact momentum of an impacting vehicle by slipping off of its base in response to the force of the impact.

Breakaway designs for these ground-mounted structures were first applied for luminaires. Basic designs were classified in four categories namely (1) frangible base, (2) progressive shear, (3) slip base, (4) other types of breakaway designs.

With any type of breakaway system, the design criteria were to decrease as much as possible the momentum change to the vehicle from the time the vehicle impacts the ground-mounted structure until it passes through the structure after breakaway. According to present safety standards, an impacting vehicle should experience no more than a 1,000 lb.-sec. momentum change and preferably less than 750 lb.-sec. If the momentum change is kept below the maximum values, the likelihood of occupants surviving a pole impact is much greater.

The frangible and progressive shear bases used in connection with luminaires are designed to either fracture or shear metal in the base at a specified base fracture energy. These designs, however, are only good for aluminum or other metal type mounts where the frangible characteristics can be built into the pole and mount.

The slip base design utilized in connection with luminaires uses a totally different concept. It consists generally of two plates with cut slots. One plate is welded to the base of the luminaire pole and the other plate is welded to a luminaire mount which is embedded into the ground. Bolts are inserted into the slots to keep the two plates together. The bolts are tightened to a predetermined torque. Upon impact, the top plate, with the luminaire support attached, tends to slide in the direction of vehicle travel. Thus, the bolts are forced to slide out of the slots, freeing the luminaire support to move with the vehicle.

Similar slip base designs have been utilized in connection with sign supports. Often the slip base will be inclined at an angle such that an impacting vehicle will give an upward acceleration to the support and sign so that the sign will pass over the top of the vehicle.

The Texas Transportation Institute has developed a notable slip base design utilizing a triangular shape with slots situated at the corners of the triangle. It is designed such that it is capable of breaking away or slipping off the base when a vehicle impacts at sufficient speed from any direction.

Although these types of slip designs have been used in connection with luminaires and sign or signal supports, there has been no indication that the same types of slip designs could be utilized in connection with timber utility poles. It has been previously thought that such timber poles were too heavy for treatment using conventional slip base technology.

In fact, up until approximately 1982, most of the work to apply breakaway technology to timber utility poles involved various arrangements of holes, grooves and saw cuts placed at strategic locations in the pole base used to weaken the pole so that it would fall or fail more easily during a vehicle impact. However, this produced problems relating to the downing of the conducting wires and transformers which created significant safety hazards, significant power outages and significant repair costs. Thereafter, another weakened zone was introduced near the top of the pole underneath the conducting wires so that the entire middle section of the pole would breakaway leaving the top portion still connected to the conductors. These designs proved to be undesirable due to the total unpredictability of the time and mode of failure. Specifically, the bored holes, saw cuts or grooves severely reduced the pole's resistance to environmental loads creating a risk that the pole would break under severe ice and/or winter storm conditions which could then create a disastrous chain reaction of downed poles. The boring of holes in the pole would also greatly decrease its service life, rendering it more susceptible to rotting. See Mac and Mason supra.

Various slip base designs were studied and tested for use in connection with utility poles. A design which has met with some approval is an adaptation of the triangular, three bolt multi-directional slip base referred to above and used in connection with luminaire and sign breakaway supports. Another design is the Hawkins Breakaway System (HBS), designed by the inventor of the subject invention and reported in a government report entitled "Safer Timber Utility Poles" by Don L. Ivey and James R. Morgan, DTFH-61-83-0-00009, September 1985. The HBS is used with timber poles which are divided lengthwise into several segments. The HBS includes a circular lower connection or slip base, an upper connection or hinge mechanism, and structural support cables. The slip base and hinge mechanism are designed to activate upon impact and are intended to reduce the inertial effects of the pole on the errant vehicle while minimizing the adverse effects on utility service. The circular slip base is also designed to withstand the overturning moments imposed by in-service wind loads and at the same time slip when subjected to the forces of a collision.

The upper hinge mechanism of the HBS is sized so as to adequately support in-service loads while providing for hinging during a collision to allow the bottom segment of the pole to rotate up and out of a vehicle's path. The upper connection reduces the effective inertia of the pole and minimizes the effect of any variation in hardware attached to the upper portion of the pole during a collision. Overhead guys serve to stabilize the upper portion of the pole during a collision and to help insure proper behavior of the upper connection. The HBS is adapted for use specifically in connection with timber utility poles and is designed to provide minimum momentum change for an impacting vehicle and to allow activation by a broad range of vehicle sizes and impact speeds while avoiding the danger of the pole falling on top of the vehicle.

The lower connection of the HBS slip base includes the installation of a circular slip base at an elevation of three inches above grade. This low elevation is intended to avoid snagging the underside of an errant vehicle. The shear plane consists of two ⅜ inch thick plates separated by a 26 gauge keeper plate (intended to maintain a 15½ inch diameter bolt circle) and by 2½ inch diameter by ⅛ inch washers. The circular base plates are connected to each other by six 1 inch diameter high strength bolts arranged in circular fashion in slots provided in the circular base plates. The bolts are torqued to 200 ft.-lbs. Connection of the wooden utility pole to the slip base is through a steel pipe or mechanical tubing which is nominally 12 inches in diameter and 30 inches long and is welded to the base plates. In addition, the base plates are braced by ⅜ inch thick stiffeners which are welded to both the base plate and the steel tube.

In the HBS, it is contemplated that the timber pole will fit entirely within the steel pipe or mechanical tube which is welded on the base plate. Moderate trimming of the timber pole can be accomplished without seriously affecting the bending strength of the pole. It is recommended that slip base tube sizes be chosen that will minimize the need for trimming. Any gaps between the tube and the timber pole can be filled with materials such as POLESET which is a 1200 psi, high-density, non-shrinking polyurethane foam available from Utility Structural Systems of Houston, Tex. for use in back filling and protecting poles in the ground.

The upper hinge connection of the HBS system consists of two four-part pole bands installed above and below a saw cut through the pole. The pole bands are secured to the pole by means of bolts. Steel straps are provided to connect the four-part pole bands above and below the saw cut through the pole. One inch diameter bolts pass entirely through the timber pole, both above and below the saw cut, in such a manner as to pass through the pole bands and the steel straps. A vertical slot located below the bolt hole in the bottom of the steel strap is separated from the bolt hole by a small margin of steel. This provides initial bending resistance. However, once the margin is punched out, as by an impacting vehicle, the resistance is greatly lessened and resistance is thereafter offered by friction between the straps and bolts, and by bending of the straps. In addition, the force required to punch out the margin can vary greatly with only small deviations in machining accuracy. Once significant rotation has occurred, the bolts bear on the end of the slot, thereby providing the required ultimate bending strength.

Steel support cables are placed immediately above the upper connection and also near the cross-arm of the utility pole. The lower structural cable serves as a pivot point for the lower pole segment when the pole is struck by an errant vehicle. This cable could be eliminated on poles where a telephone cable is present. The upper steel cable serves to stabilize the upper pole segment and minimize damage to the electrical conductors.

The Hawkins Breakaway System offers many advantages to both utility companies and occupants of impacting vehicles. In almost all cases of vehicle impact, the HBS will prevent conductor damage. In addition, extreme wind gusts, which often cause non-breakaway poles to fail close to grade bringing down and damaging conductors, will not have the same effect on poles modified by the HBS. Such poles will simply bend at the upper connection, absorbing the energy transmitted by the short duration, intense wind gusts, thus preserving the integrity of the transmission facility.

In addition, pole rot is greatly reduced by the installation of the protective sleeve and grouting material around the timber pole in the area most susceptible to pole rot.

Finally, and most importantly, the HBS saves lives by allowing an impacting vehicle to break through a slip base of a timber utility pole rather than be stopped suddenly by the rigid non-modified pole.

SUMMARY OF THE INVENTION

The present invention, which is sometimes referred to as the AD-IV system, also makes use of a shear plane concept in providing a failure mode at ground level in response to a vehicle impact The AD-IV system presents significant advantages over the HBS and other prior art. These advantages include a shear plane base which comprises a unique geometrically arranged four bolt design, having a square shape with bolts in the corners. The angle of the corner planes adjacent to the bolts minimizes the amount of steel required in manufacture while making the activation mechanism operate for any direction of collision loading. The unique geometry of the shear plane base reduces the weight of the base and thereby reduces the forces on an impacting vehicle by reducing the mass that must be accelerated to vehicle speed.

In addition, the upper connection, titled the Del-Hinge, represents significant design, performance, and economic improvements over earlier, less practical designs in the prior art. The Del-Hinge is typically used with wind straps. The simplicity of the strap design, the highly predictable load at which the strap will fail, without small tolerance machining accuracy as exists in the "small margin" of the HBS, and lower maintenance costs make this design more advantageous.

In addition, a "wind bolt" option may be used in place of the "wind strap", having all the advantages of the wind strap plus an additional very important feature. It allows the connection to be retightened subsequent to installation and during the life of the AD-IV pole after high wind, snow or other environmental loads have caused minor tilting to occur in the upper pole segment. Both the wind strap and wind bolts are used in combination with rotation straps and allow the designer to select the appropriate level of resistance to wind and ice loads while producing a mechanism which will allow rotation of the lower portion of the pole when a vehicle impact occurs.

BRIEF DESCRIPTION OF THE DRAWINGS

FIG. 1 (a)-(d) depicts a sequence beginning with a vehicle collision with a pole modified by the present invention and shows in schematic form how the pole breaks away and allows the impacting vehicle to safely proceed through the impact zone while the pole maintains the structural stability of the conductors.

FIG. 2(a) depicts the lower portion of a utility pole modified according to the present invention.

FIG. 2(b) depicts the lower portion of a utility pole inserted into a protective sleeve wherein gaps between the pole and sleeve are filled with grout.

FIG. 3 shows a side view of the lower tube and shear base in a concrete footing showing the steel bars and cage.

FIG. 7(a) depicts the upper connection or Del Hinge according to the present invention showing rotation straps and wind bolts attached to wind bolt brackets.

FIG. 7(b) shows a plan view of the attachment orientation of the pole bands and through bolts taken along line 7b of FIG. 7(a).

FIG. 8 depicts a wind bolt and bracket assembly showing the brackets attached to the pole bands and interconnected by the wind bolt.

DETAILED DESCRIPTION OF THE PREFERRED EMBODIMENT

Figure 4:
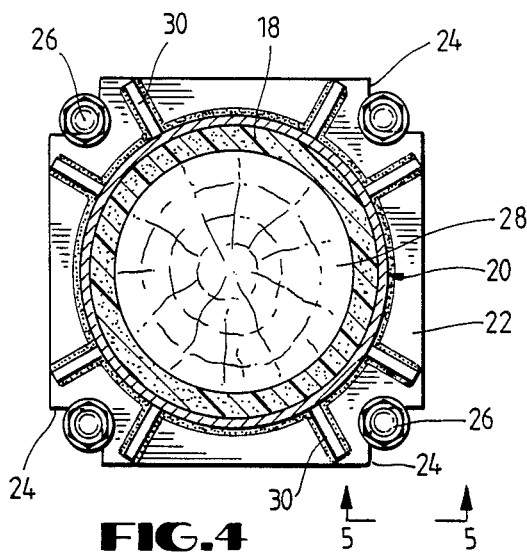
FIG. 4 shows a plan view of the tube and shear base with welded stiffeners into which a timber utility pole is put.

As shown in FIG. 1(a)-(d), the present invention relates to a system of modifying timber utility poles to provide a slip base at a lower connection and a hinge at an upper connection such that when a vehicle impacts the lower portion of the utility pole, the pole slips off the slip base and rotates upward around the upper hinge allowing the vehicle to proceed completely under the pole as the pole is suspended, and finally allowing for continuation of conductor integrity. A method is provided to make these modifications on poles already in service and on new installations of utility poles.

Referring to FIG. 2(a), there is shown a first embodiment of the present invention. A utility pole 10 which is already in service is cut in two at or near ground level. The portion 12 of the utility pole which is below ground remains in its below ground state. A protective sleeve or tube 14 which is connected to the bottom face of a lower shear base plate 16 is placed over the lower pole portion 12 and is itself pounded or otherwise inserted into the ground until the top of the lower pole portion which is at or near ground level comes into contact with the lower surface of the lower shear base plate 16. The length of the protective sleeve or tube 14 is variable depending on the desired bending resistance and on the depth of the pole subject to pole rot. Grouting material 18 may be placed in the protective sleeve or tube to tighten the fit between the pole 12 and the protective sleeve or tube 14.

Figure 5:
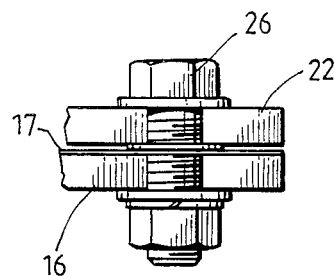
FIG. 5 shows an acceptable bolt connection detail wherein the upper base plate is connected to a lower base plate and also shows the appropriate washers and keeper plates interposed between the base plates.

Referring still to FIG. 2(a) and also to FIG. 4, an upper tube 20 is attached to an upper shear base plate 22 and is adapted to fit on top of the lower shear base plate 16. The base plates 16 and 22 are of generally square shape and have a notch 24 cut out of the corners of each plate to receive bolts 26 for connecting the upper and lower base plates together A keeper plate 17 is inserted between upper shear base plate 22 and lower shear base plate 16 to maintain the square bolt orientation and to prevent the bolts 26 from vibrating out of the notches 24 under environmental loads The keeper plate is light weight and is easily sheared upon vehicle impact. The bolts 26 are tightened a predetermined amount depending on the desired resistance to vehicle impact Once tightened, the upper base plate 22 and attached protective sleeve or tube 20 are ready to receive the upper portion 28 of the utility pole 10. FIG. 5 depicts a cut away section showing the bolt 26 holding together the upper and lower base plates.

It is anticipated that the size of the sleeve 20 is determined based on the size of the utility pole 10. However, in the event the utility pole 10 is larger in diameter than the protective sleeve 20, moderate trimming of the timber pole can be done to accommodate the protective sleeve. Care must be taken, however, to avoid significant reductions in the moment of inertia of the pole which would render the pole incapable of withstanding environmental loads. As shown in FIG. 2(b), in the event the pole fits easily within the protective tube, grouting material 18 may be inserted between the pole 10 and inner walls of the protective tube 20 to tighten the fit of the pole. A specially formulated asphaltic extended polyurethane foam available from Utility Structural Systems is a suitable grout for this application.

Referring still to FIGS. 2 and 4, both the upper and lower shear base plates are provided with a plurality of stiffeners 30 situated on either side of each of the four bolts. Stiffeners 30 on the upper shear base plate begin from the top surface of the plate 22 and extend upwardly on the protective tube 20. Conversely, stiffeners 30 on the lower base plate 16 protrude from the bottom face thereof and extend downward along the protective tube 14. The stiffeners are welded or otherwise joined to the base plates and the protective tubes.

The distance above ground level which the lower base plate 16 and protective tube 14 extends is small so as to avoid snagging the underside of an errant vehicle. Based on the weight of the upper base plate 22 and protective tube 20 with inserted pole 28 and pole load, an activation boundary, which is the lowest momentum which will activate the system, can be predetermined. The desired activation boundary for the AD-IV system of the present invention is contemplated to be relatively low or at about ten miles per hour. Obviously, the size of the impacting vehicle has substantial effect on the activation boundary. Vehicles weighing more are capable of activating the slip base at a slower speed than vehicles of a lighter weight.

The square shape of the base plates 16 and 22 renders the base section lighter than the circumferential design of the prior art because less steel is required to form the square plates. The reduction in weight reduces the momentum change occurring in an impacting vehicle. In addition, manufacturing the square plate generates substantially less waste in steel than the manufacture of the circular plate. In addition, the four corner bolt geometry allows for biaxial symmetry of the slip base. In other words, the square base plate of the present invention has the same resistance to sliding whether impacted at zero degrees or impacted at 90 degrees. In the circumferential design of the prior art, there is no biaxial symmetry. In the prior art HBS system, the circumferential design is more difficult to activate when impacted at 90 degrees than when impacted at zero degrees.

FIG. 3 depicts a second embodiment of the lower connection of the invention which is especially suitable for new installations. In this embodiment, the step of first implanting the utility pole in the ground can be avoided. Rather a concrete footing 32 is placed in the ground. The concrete footing has steel reinforcement 34 running the entire length of the footing, and is adapted to receive a lower tube portion 14 which is connected to the bottom face of a lower shear base plate 16. The footing may also be prefabricated with the lower tube portion cast in place Steel reinforcement 34 is shown in FIG. 3 as being a steel coil.

Steel bars 36 are designed to fit within the lower tube 14 and concrete footing 32 to maintain the relative orientation of the lower tube and shear base plate with the footing 32.

An upper tube 20 is attached to the upper face of an upper shear base plate 22 and is placed upon the lower shear base plate 16 and bolted together at the four corners of the base plates in much the same manner as the previous embodiment. FIGS. 4 and 5 may be considered to apply to the embodiment of FIG. 3 as well as the embodiment of FIG. 2. When the bolts 26 are tightened to a desired torque, the utility pole 28 is inserted into the upper protective tube 20 and either trimmed or grouted to form a tight desirable fit. As in the previous embodiment, the lower connection is designed to be activated at the predetermined activation boundary.

Figure 6A:
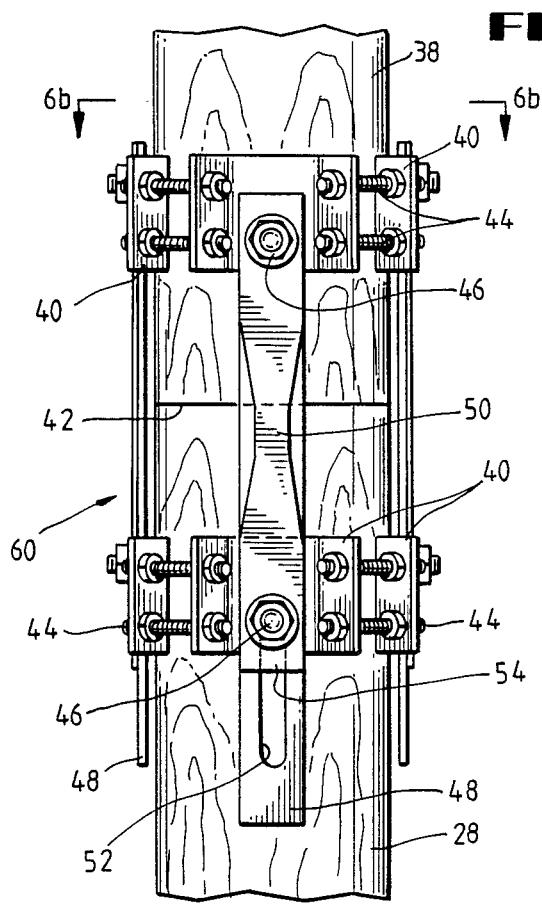
FIG. 6(a) depicts the upper Del-Hinge connection with pole bands, rotation straps and wind straps.
Figure 6B:
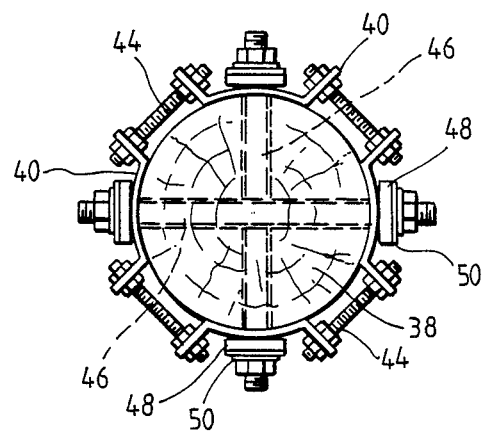
FIG. 6(b) depicts a plan view of the pole bands and through bolts taken along line 6b shown in FIG. 6(a).

Referring now to FIG. 6(a), there is depicted a first embodiment of the upper connection 60 of a utility pole according to the present invention. In this first embodiment, the pole 10 is cut in two pieces at a desired location above ground level, generally between ten and fourteen feet, or higher as needed. For a utility pole already in service, it is necessary to maintain the vertical position of the upper segment 38 of the pole as there will be nothing else holding the pole in place during modification. Two four-part pole bands 40 are installed above and below the saw cut 42 through the pole. The pole bands 40 are secured to the pole by tightening the bolt connections 44 which interconnect the four parts. In addition, the pole bands 40 are further secured to the pole by means of through bolts 46 which are drilled entirely through the timber pole 10, passing through the pole bands 40. There are two such through bolts 46 in each of the upper and lower four-part pole bands 40. Further, the through bolts 46 preferably pass through the utility pole 10 in perpendicular relation to one another. Thus, in the upper four-part pole band, two through bolts are installed in perpendicular relation to one another and preferably in parallel orientation with respect to the corresponding through bolts in the lower four-part pole band. The upper through bolts are in a plane parallel to, but in vertical separation from, the lower through bolts, being on the opposite side of the saw cut 42 FIG. 6(b) depicts a plan view showing the orientation of pole bands and through bolts in accordance with the present invention.

Before nuts are attached to the through bolts 46 to tighten the pole bands 40 to the pole in this first embodiment, a combination of rotation straps 48 and wind straps 50 is placed on the through bolts 40 such that the upper portions of both a rotation strap 48 and a wind strap 50 are attached to an upper through bolt 46. The straps run vertically downward parallel to the longitudinal axis of the utility pole and are attached at their lower portions to the lower through bolt 46. Each rotation strap 48 has a vertical slot 52 in the lower portion thereof which provides the lower attachment with the lower through bolt 46. The wind straps 50 provide initial resistance to bending. But, when a sufficient force is applied to the lower connection of the utility pole causing the lower connection to slip, the wind strap 50 fails. The bolt 46 is then free to slide along the slot 52, and the straps 48 are free to bend. Once significant rotation has occurred, the bolts 46 bear on the end of the slot 52, thereby limiting the angular extension of the straps 48 and providing the required ultimate bending strength.

Referring still to FIG. 6(a), the winds straps 50, which are attached in similar fashion between the upper and lower through bolts 40 on four sides of the pole spaced about ninety degrees from each other, provide a significant advantage not present in the prior art. Specifically, the wind straps 50 allow a designer to select the appropriate level of resistance to wind and ice loads while producing a mechanism which will allow rotation of the lower portion 28 of the pole when a vehicle impact occurs. This is accomplished by adjusting the cross-section of the wind straps 50 at the middle portion thereof and by varying the steel strength of the wind straps. Based on the wind straps' cross-sectional area and steel strength, it is possible to determine very accurately the load under which strap failure will occur.

During normal operation, when the utility pole is in its full upright position, the wind straps are capable of resisting environmental loads which would tend to bend the upper pole portion 38 relative to the lower pole portion 28. If the environmental load exceeds the straps' strength as determined by cross-sectional area and steel strength, then the wind straps will fail leaving the rotation straps as the only remaining resistance to rotation. However, the rotation straps 48 would most likely give way or bend given that there would no longer be any initial resistance to rotation and the upper portion 38 of the utility pole would be free to rotate around the upper hinge 60. This is obviously an undesirable effect.

Therefore, it is desired to select a cross-sectional area and steel strength for the straps capable of resisting most of the anticipated environmental loads. However, it is also important to avoid making the wind strap 50 of such strength such that it would resist rotation resulting from an impacting vehicle at the lower connection of the utility pole. If the wind strap provided this type of resistance, then disastrous effects could occur—e.g., a domino effect downing a series of utility poles or at least downing the utility pole in question and damaging the conductors and transformers attached to the utility pole. However, the presence of the wind straps allows the designer this type of flexibility. Without the wind straps, the rotation straps may not be capable of withstanding commonly occurring environmental loads.

Referring now to FIGS. 7 and 8, therein is depicted a second embodiment for the upper hinge 60, wherein wind bolts 56 are provided in place of the wind straps. As shown in FIG. 7(a), the wind bolts are placed in parallel alignment with the longitudinal axis of the utility pole and are also parallel to the rotation straps 48. They are held in place by and run between wind bolt brackets 58. The wind bolt brackets are attached to the upper and lower pole bands 40 at the location of the through bolt 46. Each wind bolt bracket 58 is designed in an L shape with the short leg 62 of the L-bracket being perpendicular to the length of the utility pole and the long leg 64 of the L-bracket being flush with the rotation strap 48. A hole is placed in the outermost portion of leg 64 for receiving the through bolt 46. The short leg 62 of the L-bracket has a bolt hole 66 adapted to receive the wind bolts 56. One bolt bracket 58 is attached at the upper pole band such that the short leg 62 of the L-bracket is at the lower end of the longer leg 64. A second bolt bracket 58 is attached to the lower pole band such that the short leg 62 of the L-bracket is at the upper end of the long leg 64. The wind bolt 56 extends through the short legs 62 of each L-bracket and a nut 68 is attached to the lower portion thereof at the lower bracket and is tightened as needed.

The wind bolt 56 serves essentially the same function as the wind strap 50. It is intended to provide resistance to environmental loads. As with the wind strap, the failure strength of the wind bolt is determined based on the steel strength and cross-sectional area of the bolts. This failure strength can be very accurately determined. An advantage of this alternative is that the connection between the upper pole segment 38 and lower pole segment 28 can be tightened subsequent to installation and during the life of the AD-IV pole after high wind or snow or other environmental loads have caused minor tilting to occur in the upper pole segment. Tightening is done to the wind bolt sufficient to bring the upper pole segment into axial alignment with the lower pole segment.

Both the wind bolt and the wind strap serve to maintain the axial alignment of the upper and lower AD-IV pole sections.

Various modifications and improvements may be made to the disclosed embodiments of the present invention without departing from the overall scope and spirit of the invention.

What is claimed is:

1. A breakaway apparatus for a timber utility pole or the like comprising:
   (a) a first lower tubular member adapted at a lower end to be inserted into the ground and adapted to receive the upper end of a first segment of a timber utility pole;
   (b) a square lower shear base plate attached to the upper end of the lower tubular member;
   (c) an upper tubular member adapted at its upper end to receive the lower end of a second segment of the timber utility pole;
   (d) a square, upper shear base plate attached to the lower end of the upper tubular member;
   (e) a recess in each corner of each base plate shaped to receive a connecting bolt so as to axially align the two base plates when bolts are installed in the recesses to connect the two tubular members together end-to-end;
   (f) a first band adapted to be locked in place around an upper end of the second pole segment;
   (g) a second band adapted to be locked in place around a lower end of a third segment of the timber utility pole;
   (h) a first set of frangible connectors spaced around the timber utility pole and adapted to interconnect the two bands so as to hold the second and third pole segments in longitudinal alignment, said first set of frangible connectors having sufficient strength to enable the pole to resist lateral wind or environmental loads but being frangible upon a pre-selected minimum impact of a vehicle on the pole at ground level; and
   (i) a second set of frangible connectors spaced around the pole and interconnecting the two bands, said second set of flexible connectors including a slotted end permitting sufficient longitudinal freedom of movement between the two bands to enable the upper end of the second pole segment and the lower end of the third pole segment to flex relative to one another.

2. A breakaway flex joint for a longitudinally segmented timber utility pole, comprising:
   (a) a plurality of bands adapted to be locked in place around one end of a first segment of the pole;
   (b) a plurality of bands adapted to be locked in place around one end of a second segment of the pole;
   (c) a plurality of frangible connectors adapted to be rigidly connected at opposite ends to said plurality of bands and spaced around said plurality of bands wherein said frangible connectors have sufficient strength to enable the pole to resist lateral wind or environmental loads but are frangible upon a pre-selected minimum impact force of a vehicle on the pole at ground level; and
   (d) a plurality of flexible connectors adapted to be connected at opposite ends to said plurality of bands and spaced around said plurality of bands, said flexible connectors being capable of limited angular extension wherein said first and second segments of the pole are allowed to flex relative to one another, an end of each of said flexible connectors having a vertical slot limiting the angular extension of said first and second pole segment and providing resistance to further angular extension.

3. The joint of claim 2 wherein each flexible connector comprises a strap and said opposite ends consists of a first end adapted to be rigidly connected to a pole segment and a second end defined by said vertical slot.

4. The joint of claim 2 wherein each frangible connector is a strap having a predetermined steel strength and cross-sectional area and wherein the steel strength and cross-sectional area of said strap provide resistance to bending or rotation forces up to the failure strength of said strap caused by the tendency toward rotation of said lower pole segment after being impacted by a vehicle, or by the tendency toward rotation of said upper pole segment after being impacted by environmental loads.

5. The joint of claim 2 wherein each frangible connector is a bolt having a predetermined steel strength and cross-sectional area and wherein the steel strength and cross-sectional area of said bolt provide resistance to bending or rotation forces up to the failure strength of said bolt caused by the tendency toward rotation of said lower pole segment after being impacted by a vehicle, or by the tendency toward rotation of said upper pole segment after being impacted by environmental loads.

6. The joint of claim 5 wherein said bolts extend between brackets which are L-shaped and are oriented on both the first and second pole segments such that the short leg of each said L-brackets is perpendicular to the longitudinal axis of said utility pole, each said short leg including a bolt hole for receiving said bolts and wherein tension is variably applied to said bolts extended between said brackets to correct the alignment of said first pole segment with said second pole segment.

7. A timber utility pole comprising:
   (a) a lower pole segment adapted to be anchored in the ground with its upper end proximate the surface of the ground;
   (b) a middle pole segment attached in a laterally shearable, axially aligned relation to the upper end of the lower pole segment;
   (c) an upper pole segment;
   (d) a plurality of flexible connectors connecting the lower end of the upper pole segment to the upper end the middle pole segment, said flexible connectors including a slotted end permitting angular extension of said lower and upper pole segments between a flush, vertically aligned position and an angled position, said flexible connectors capable of maintaining said angled position, but not the vertically aligned position in the absence of axial support from the lower pole segment, and
   (e) a plurality of frangible connectors connecting the lower end of the upper pole segment with the upper end of the middle pole segment, said frangible connectors having sufficient strength to keep said upper and middle segments in axial alignment responsive to environmental forces, but being frangible upon a rotation force due to a vehicle impacting the lower end of the middle pole segment.

8. A method of installing a breakaway system on an in-service timber utility pole, comprising:
   (a) supporting the pole at its upper end;
   (b) severing the pole at a first point proximate ground level and at a second point between the first point and the upper end of the pole defining bottom, middle and top pole segments;
   (c) connecting the bottom pole segment with the middle pole segment at the first point in a laterally shearable, axially aligned relation;
   (d) connecting the middle pole segment to the top pole segment with a plurality of flexible connectors, each connector having a slotted end, in an axially aligned relation, said slotted ends permitting limited angular extension of said middle and top pole segments, between flush, vertically aligned position and an angled position, said connection being capable of maintaining the angled position but not the vertically aligned position in the absence of support from the bottom segment; and
   (e) separately connecting the middle pole segment to the top pole segment with frangible connectors in axially aligned relation, said connection having sufficient strength to keep said upper and middle pole segments in axial alignment responsive to environmental forces, but frangible upon a rotation force due to a vehicle impacting the lower end of the middle pole segment.

9. A method of installing a breakaway system on a new installation for a timber utility pole, comprising:
   (a) mounting the pole in an axially aligned relation with respect to a tubular member embedded in a concrete footing in the ground;
   (b) supporting the pole at its upper end;
   (c) severing the pole at a first point proximate ground level and at a second point between the first point and the upper end of the pole to define bottom, middle and top pole segments;
   (d) connecting the bottom pole segment to the top pole segment with a plurality of flexible connectors, each connector having a slotted end, in an axially aligned relation, said slotted ends permitting limited angular extension of said middle and top pole segments, between a flush, vertically aligned position and an angled position, said flexible connectors being capable of maintaining the angled position but not the vertically aligned position in the absence of support from the bottom segment; and
   (e) separately connecting the lower pole segment to the top pole segment with frangible connectors in axially aligned relation capable of withstanding environmental forces but being frangible upon a pre-selected minimum impact of a vehicle on the pole at ground level.

* * * * *